H. CARTWRIGHT.
Harrows.
No. 135,464. Patented Feb. 4, 1873.
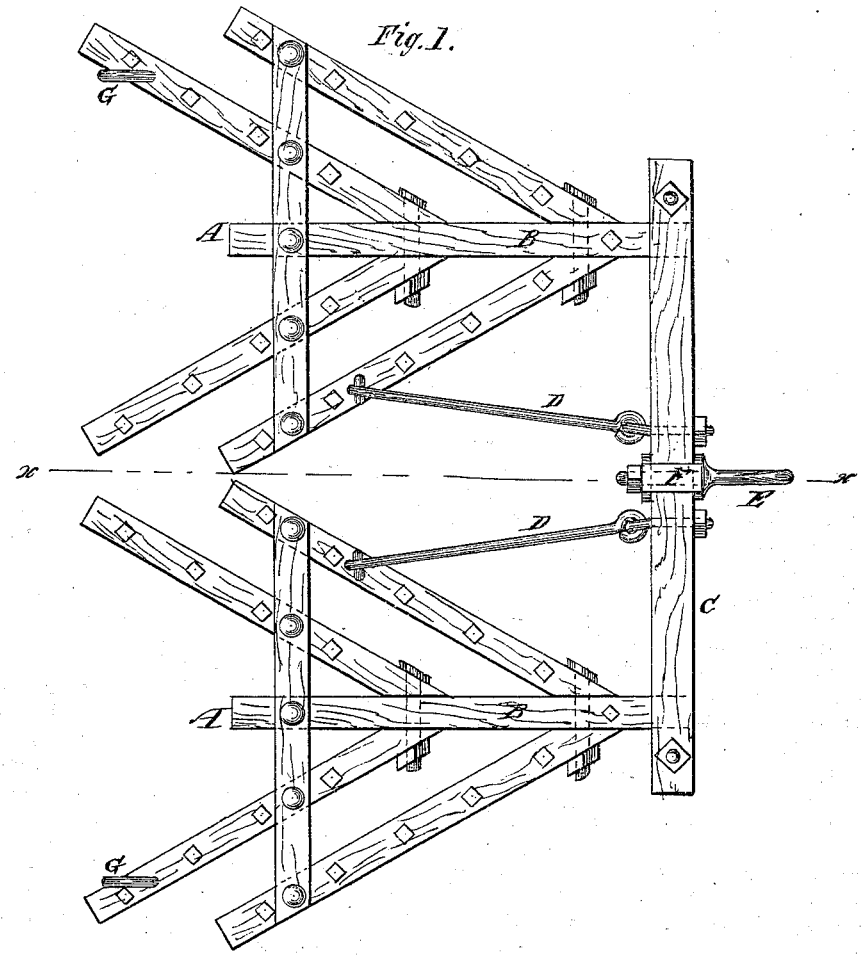
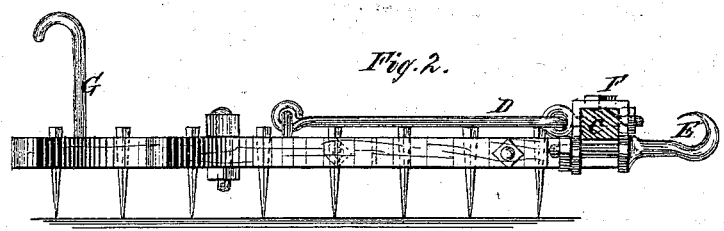
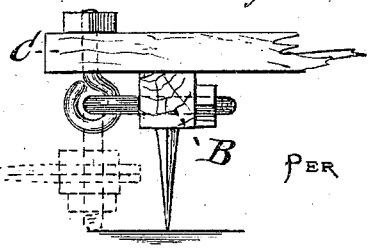
Witnesses:
P. C. Dieterich
C. Sedgwick
Inventor:
H. Cartwright
per
Attorneys.

UNITED STATES PATENT OFFICE.

HIRAM CARTWRIGHT, OF OWATONNA, MINNESOTA.

IMPROVEMENT IN HARROWS.

Specification forming part of Letters Patent No. 135,464, dated February 4, 1873.

*To all whom it may concern:*

Be it known that I, HIRAM CARTWRIGHT, of Owatonna, in the county of Steele and State of Minnesota, have invented a new and useful Improvement in Harrows, of which the following is a specification:

The invention consists in a new mode of connecting together the sections of a double harrow, so that the two will be held apart and each be susceptible of being turned up independently of the other, as hereinafter fully described.

In the accompanying drawing, Figure 1 represents a top or plan view of the harrow. Fig. 2 is a vertical cross-section taken on the line $x\ x$ of Fig. 1. Fig. 3 is a detail showing the joint which forms the connection of the front of the sections with the draft-bar.

Similar letters of reference indicate corresponding parts.

This is a double harrow, being made in two sections, A A, which are identical in form and size, and in themselves presenting no particular novelty, but united or jointed to the draft-bar, and combined as they are, they form a harrow possessing important advantages over the harrows now in use. B is the center-piece of each section. C is the draft-bar, to which the two sections A A are jointed by means of eyebolts, as seen in Fig. 3. D D are rods, by means of which each section is connected with the middle of the draft-bar. These rods are jointed both to the harrows and to the bar C, as shown in Fig. 1 of drawing. E is the draft-hook, attached by a clip, F, to the center of the draft-bar. G G are hooks or handles, securely fastened to each section for convenience in raising the sections in passing obstructions. The sections A A are so arranged that their rear inner ends come nearly in contact, and so that, in being drawn forward, the entire ground covered by the harrow is operated upon. The sections being separately jointed to and connected with the draft-bar, the harrow is very flexible and will conform to the inequalities of the ground, and is made to pass obstructions with great facility.

Having thus described my invention, I claim as new and desire to secure by Letters Patent—

The described means for connecting two sections of a double harrow, consisting of the bar C, center-pieces B B, and rods D D, arranged and applied as set forth.

HIRAM CARTWRIGHT.

Witnesses:
    B. N. MAY,
    G. W. MCKAY.